United States Patent
Wang

(10) Patent No.: US 10,025,016 B2
(45) Date of Patent: Jul. 17, 2018

(54) BACKLIGHT SOURCE AND TRANSPARENT DISPLAY DEVICE

(71) Applicant: BOE TECHNOLOGY GROUP CO., LTD., Beijing (CN)

(72) Inventor: Shang Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 107 days.

(21) Appl. No.: 14/430,149

(22) PCT Filed: Jul. 31, 2014

(86) PCT No.: PCT/CN2014/083431
§ 371 (c)(1),
(2) Date: Mar. 20, 2015

(87) PCT Pub. No.: WO2015/109812
PCT Pub. Date: Jul. 30, 2015

(65) Prior Publication Data
US 2016/0025917 A1    Jan. 28, 2016

(30) Foreign Application Priority Data
Jan. 26, 2014  (CN) .......................... 2014 1 0038079

(51) Int. Cl.
*F21V 8/00* (2006.01)
*G02F 1/1335* (2006.01)

(52) U.S. Cl.
CPC .......... *G02B 6/0006* (2013.01); *G02B 6/0008* (2013.01); *G02F 1/133615* (2013.01); *G02B 6/0028* (2013.01)

(58) Field of Classification Search
CPC .. G02B 6/0006; G02B 6/0008; G02B 6/0028; G02B 6/0061; G02F 1/133615

(Continued)

(56) References Cited

U.S. PATENT DOCUMENTS 4,883,333 A * 11/1989 Yanez ................... G02B 6/032
                                                                 362/551
5,301,090 A    4/1994 Hed
(Continued)

FOREIGN PATENT DOCUMENTS

CN         1908767 A    2/2007
CN       101390006 A    3/2009
(Continued)

OTHER PUBLICATIONS

Nov. 18, 2015 (CN) Notice of Allowance—Application No. 201410038079.7.
(Continued)

*Primary Examiner* — Anh Mai
*Assistant Examiner* — Arman B Fallahkhair
(74) *Attorney, Agent, or Firm* — Banner & Witcoff, Ltd.

(57) ABSTRACT

A backlight source comprising a light source, guide fibers and transmission fibers, the guide fibers and the transmission fibers are coupled by means of a coupling joint, wherein the first end of the guide fiber is coupled to the light source, the second end of the guide fiber is flexibly coupled to the first port of the coupling joint, and/or the first end of the transmission fiber is flexibly coupled to the second port of the coupling joint, and the second end of the transmission fiber is provided with a reflection head; the light emitted from the light source passes through the guide fiber and enters into the coupling joint, then is transmitted into the transmission fiber, and is finally emitted by the reflection head. The backlight source is collapsible and is thus flexible and convenient to use. Embodiments of the present disclosure also provide a transparent display device.

6 Claims, 5 Drawing Sheets

(58) Field of Classification Search
USPC ....... 362/559, 551, 554, 561, 615, 560, 511, 362/556, 581, 600; 349/62; 385/88
See application file for complete search history.

(56) References Cited

U.S. PATENT DOCUMENTS

| | | | | |
|---|---|---|---|---|
| 5,857,761 | A * | 1/1999 | Abe | G02B 6/001 362/268 |
| 6,428,198 | B1 * | 8/2002 | Saccomanno | G02B 6/0006 362/552 |
| 6,655,825 | B2 * | 12/2003 | Muthu | G02B 6/0028 362/555 |
| 6,776,497 | B1 * | 8/2004 | Huppi | G06F 1/1616 362/109 |
| 6,915,038 | B2 * | 7/2005 | Guy | G02B 6/4298 385/16 |
| 7,581,863 | B2 * | 9/2009 | Lester | G02F 1/133603 362/561 |
| 7,780,655 | B2 * | 8/2010 | Strassl | A61B 18/20 606/13 |
| 8,073,297 | B2 * | 12/2011 | Griffin | A61B 18/24 29/428 |
| 8,654,065 | B2 * | 2/2014 | Nittou | G07F 17/3202 345/102 |
| 8,724,942 | B2 * | 5/2014 | Logunov | F21V 13/02 385/125 |
| 2005/0237761 | A1 * | 10/2005 | Lasota | G02B 6/0013 362/551 |

FOREIGN PATENT DOCUMENTS

| | | |
|---|---|---|
| CN | 101495925 A | 7/2009 |
| CN | 102096235 A | 6/2011 |
| CN | 101558352 B | 3/2012 |
| CN | 202452315 U | 9/2012 |
| CN | 103791325 A | 5/2014 |
| EP | 1944633 A1 | 7/2008 |
| JP | 2008256853 A | 10/2008 |
| KR | 10-2005-0101498 A | 10/2005 |

OTHER PUBLICATIONS

Jul. 3, 2015—(CN) First Office Action—Application No. 201410038079.7.
Nov. 4, 2014—(WO) ISR—App. No. PCT/CN14/083431—with Eng Tran of Written Opinion.

* cited by examiner

BACKLIGHT SOURCE AND TRANSPARENT DISPLAY DEVICE

The application is a U.S. National Phase Entry of International Application No. PCT/CN2014/083431 filed on Jul. 31, 2014, designating the United States of America and claiming priority to Chinese Patent Application No. 201410038079.7 filed on Jan. 26, 2014. The present application claims priority to and the benefit of the above-identified applications and the above-identified applications are incorporated by reference herein in their entirety.

TECHNICAL FIELD

Embodiments of the present disclosure relates to a backlight source and a transparent display device.

BACKGROUND

In the display field, a display device usually comprises a backlight module and a display panel, and in the techniques known to the inventor, the Cold Cathode Fluorescent Lamp (CCFL), Light Emitting Diode (LED) and the like are commonly used as the light source for a backlight module. And due to high luminance capacity, compactness, better monochromatism, long service time, good reliability and the like, LED light sources have already become main stream of illumination at present.

Most of current liquid crystal display devices employ LEDs as their backlight sources, however, these LED or CCFL light sources are not applicable for transparent display. In techniques know to the inventor, the transparent display device is achieved by manufacturing a special light guide plate, wherein two opposite sides of the light guide plate arranged oppositely to each other are provided with transparent electrodes, and the two transparent electrodes are provided with special high molecular materials, and the light guide plate completely covers the display region at the light emitting side of the backlight source.

In such a backlight source, however, it is very complex to manufacture such a light guide plate, and the manufactured transparent display device further requires a light guide plate to convert a point source or a line source emitted from the light source into a surface light source and projects the same onto a liquid crystal screen, so as to achieve the display function. However, besides Cold Cathode Fluorescent Lamps or Light Emitting Diodes, existing backlight sources further incorporate some functional films, and these parts are further combined by means of the outermost frame to produce a backlight module, and finally, the obtained backlight module is combined with a display panel to create a display device. But it is not flexible for such a backlight source to be assembled or to be used, therefore in the transparent display field, it is still difficult to design and manufacture a backlight source in the transparent display field.

SUMMARY

One of the technical problems to be solved by embodiments of the present disclosure is to provide a backlight source used for a transparent display device, which permitting flexible operation on the backlight source.

To solve the above technical problem, at least one embodiment of the present disclosure provides a backlight source, comprises a light source, guide fibers and transmission fibers, the guide fibers and transmission fibers are coupled by a coupling joint, wherein a first end of the guide fiber is coupled with the light source and a second end thereof is coupled with a first port of the coupling joint, the coupling joint is provided with a reflection element therein, a first end of the transmission fiber is coupled with a second port of the coupling joint, and the second end of the transmission fiber is provided with a reflection head;

wherein light emitted from the light source passes through the guide fiber and enters into the coupling joint, then is reflected by the reflection element in the coupling joint, the reflected light enters into the transmission fiber, and is finally emitted by the reflection head.

In one embodiment according to the present disclosure, the light source is a light source of narrow divergence angle in a range of 0°~15°.

In one embodiment according to the present disclosure, the guide fiber is a conical fiber, a top end of which is coupled with the light source and a bottom end of which is coupled with the coupling joint.

In one embodiment according to the present disclosure, the guide fiber is orthogonal to the transmission fiber.

In one embodiment according to the present disclosure, the second end of the guide fiber is flexibly coupled with the first port of the coupling joint, and/or the first end of the transmission fiber is flexibly coupled with the second port of the coupling joint.

In one embodiment according to the present disclosure, the reflection head is a total reflection head, and the light emitted from the transmission fiber is total reflected light.

In one embodiment according to the present disclosure, an end of the reflection head is further provided with a curved lens, through which the reflected light passes to obtain uniform light.

To solve the above technical problem, at least one embodiment of the present disclosure also provides a the transparent display device comprising a display screen and a frame, and further comprising the above backlight source, a back side of the frame is provided with grooves in which the backlight source is embedded, The guide fibers of the backlight source are always embedded within the grooves at the back side of the frame, the transmission fibers are embedded within the grooves at the back side of the frame when being folded up, and the transmission fiber can rotate around a central axis of the guide fiber and thus protrude from the groove when being unfolded;

When the transmission fiber is unfolded and the light source emits light, the light emitted from the backlight source can be projected onto the back side of the display screen.

In one embodiment according to the present disclosure, the guide fiber and the transmission fiber of the backlight source are orthogonal to each other, and the frame has a rectangular shape;

the coupling joint of the backlight source is embedded within one of the four corner portions of the frame, and the guide fiber and the transmission fiber are respectively embedded within grooves constituting two sides of the corner portion.

In one embodiment according to the present disclosure, the transmission fiber is perpendicular to a plane of the display screen when being sufficiently unfolded.

In one embodiment according to the present disclosure, when the transmission fiber being unfolded, the guide fiber can rotate within the groove, and the transmission fiber rotates along with the guide fiber and thus protrudes from the groove; or The second end of the guide fiber is flexibly coupled with the first port of the coupling joint, when the transmission fiber is unfolded, the guide fiber is fixed within the groove and rotates with respect to the coupling joint.

Embodiments of the present disclosure provide a backlight source and a transparent display device, wherein the backlight source comprises a light source, guide fibers and transmission fibers, the guide fibers and transmission fibers are coupled with each other by means of a coupling joint, wherein the first end of the guide fiber is coupled with the light source and the second end of the guide fiber is coupled with the first port of the coupling joint, the coupling joint is provided with reflection elements therein, the first end of the transmission fiber is coupled with the second port of the coupling joint, and the second end of the transmission fiber is provided with a reflection head; the light emitted from the light source passes through the guide fiber and enters into the coupling joint, and then is reflected by the reflection element in the coupling joint, the reflected light enters into the transmission fiber and is emitted by the reflection head. The aforesaid backlight source utilizes the fiber as a light pipe, and couples two segments of fibers with a coupling joint, the light from the light source arrives at the coupling joint through the guide fiber, and is reflected and then transmitted along the transmission fiber, and finally is reflected by the reflection head, the emitted light is projected onto the back side of the display screen, thus the backlight is achieved. Due to the characteristic of being collapsible, the aforesaid backlight source is flexible and convenient to use, and is suitable for the backlight of the transparent display device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiment One

Figure 1:
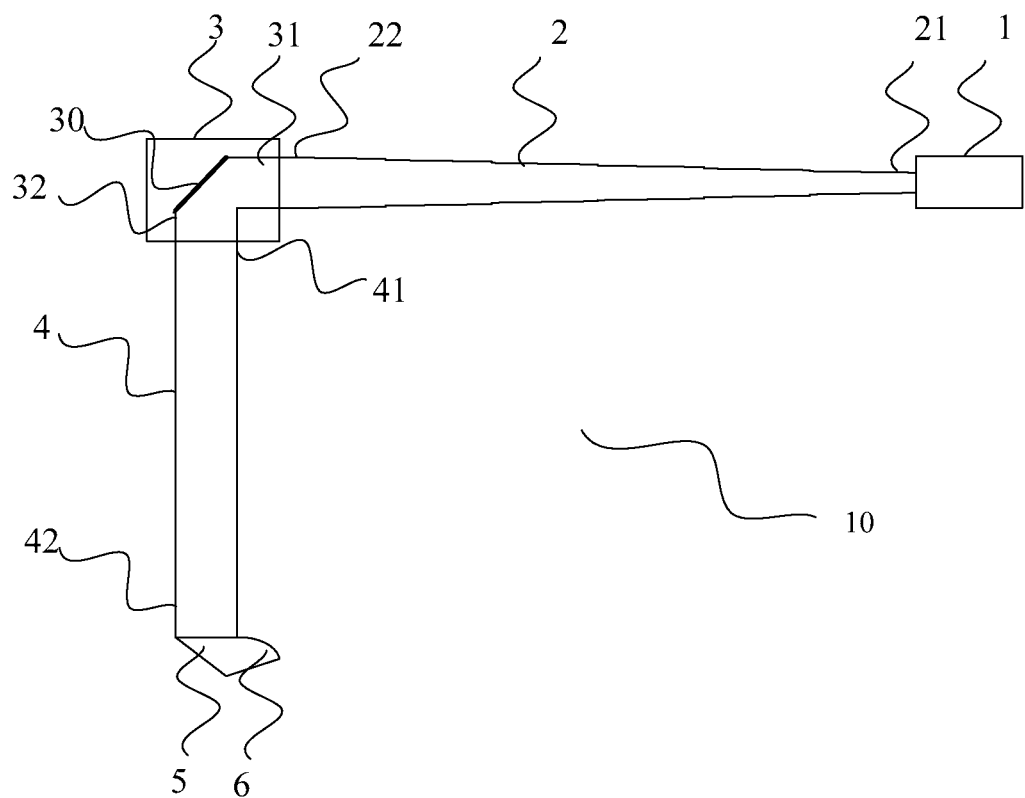
FIG. 1 is a schematic structural view illustrating a backlight source according to the first embodiment of the present disclosure.

The first embodiment of the present disclosure provides a backlight source 10, the schematic structural view thereof is illustrated in FIG. 1, the backlight source comprises a light source 1, guide fibers 2 and transmission fibers 4, the guide fibers 2 and the transmission fibers 4 are coupled by means of a coupling joint 3, wherein the first end 21 of the guide fiber 2 is coupled with the light source 1 and the second end 22 of the guide fiber 2 is coupled with the first port 31 of the coupling joint 3, the coupling joint 3 is provided with reflection elements 30 therein, the first end 41 of the transmission fiber 4 is coupled with the second port 32 of the coupling joint 3, and the second end 42 of the transmission fiber 4 is provided with a reflection head 5;

light emitted from the light source 1 passes through the guide fiber 2 and enters into the coupling joint 3, then is reflected by the reflection element 30 in the coupling joint 3, and the reflected light enters into the transmission fiber 4, and is finally emitted by the reflection head 5.

The light source 1 of the present embodiment is a light source of a narrow divergence angle in a range of 0°~15°. Further, the range of the divergence angle of the light source is selected on the basis of diameter of fiber core of the guide fiber, transmission requirement and other various elements, the range for the divergence angle provided by the present embodiment is 0°~15°, which is applicable to common fibers and meets the transmission requirement of image display.

In the present embodiment, the guide fiber 2 is a conical fiber, its structure is as illustrated in FIG. 1, the top end of the conical fiber is coupled with the light source 1 and the bottom end of the conical fiber is coupled with the coupling joint 3. Such a conical fiber builds up a light cone, which can not only possess characteristics of a fiber panel, such as good light convergence, transmitting images with a high resolution and without distortion, and so on, but also can provide an image transmission which is enlarged or reduced and has no distortion, accordingly, such a light cone could satisfy requirements of inputting or outputting images of various specs. For example, this embodiment can select a conical fiber as the guide fiber.

Further, the guide fiber 2 and the transmission fiber 4 in this embodiment are orthogonal to each other, and the second end 22 of the guide fiber 2, the first end 41 of the transmission fiber 4 are coupled with the first port 31 and the second port 32 of the coupling joint 3 respectively. Thus, light emitted from the light source is transmitted to the coupling joint 3 through the guide fiber 2, and is reflected in the coupling joint 3 by the reflection element 30, and the reflected light enters into the transmission fiber 4, as illustrated in FIG. 1.

Figure 2:
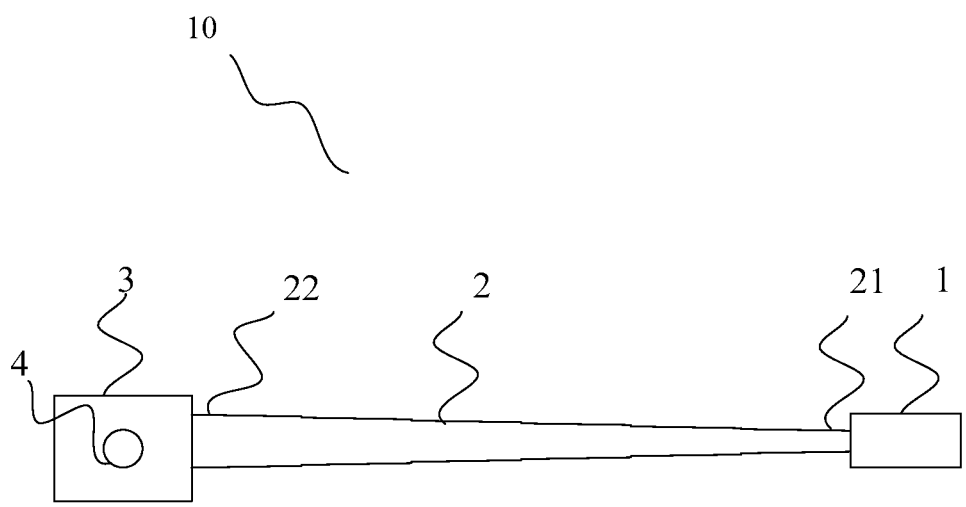
FIG. 2 is a top view of a transmission fiber according to the first embodiment of the present disclosure.

Further, the second end 22 of the guide fiber 2 in this embodiment is flexibly coupled with the first port 31 of the coupling joint 3, and/or the first end 41 of the transmission fiber 4 is flexibly coupled with the second port 32 of the coupling joint 3. The transmission fiber 4 is collapsible, and the transmission fiber 4 is perpendicular to the guide fiber 2 in the horizontal plane before being folded while is perpendicular to the guide fiber 2 in the vertical plane after being folded. FIG. 2 illustrates the top view of the transmission fiber 4 after being folded, that is, only the light source 1, the guide fiber 2 and the coupling joint 3 can be seen.

And furthermore, the reflection head 5 according to this embodiment is a total reflection head, light emitted from the transmission fiber is total reflection light.

And further, an end of the reflection head 5 according to this embodiment is further provided with a curved lens 6, through which the reflected light passes to obtain uniform light. For example, this curved lens is a free-formed curved lens, and the light is refracted by the refracting surface of the lens.

Figure 3:
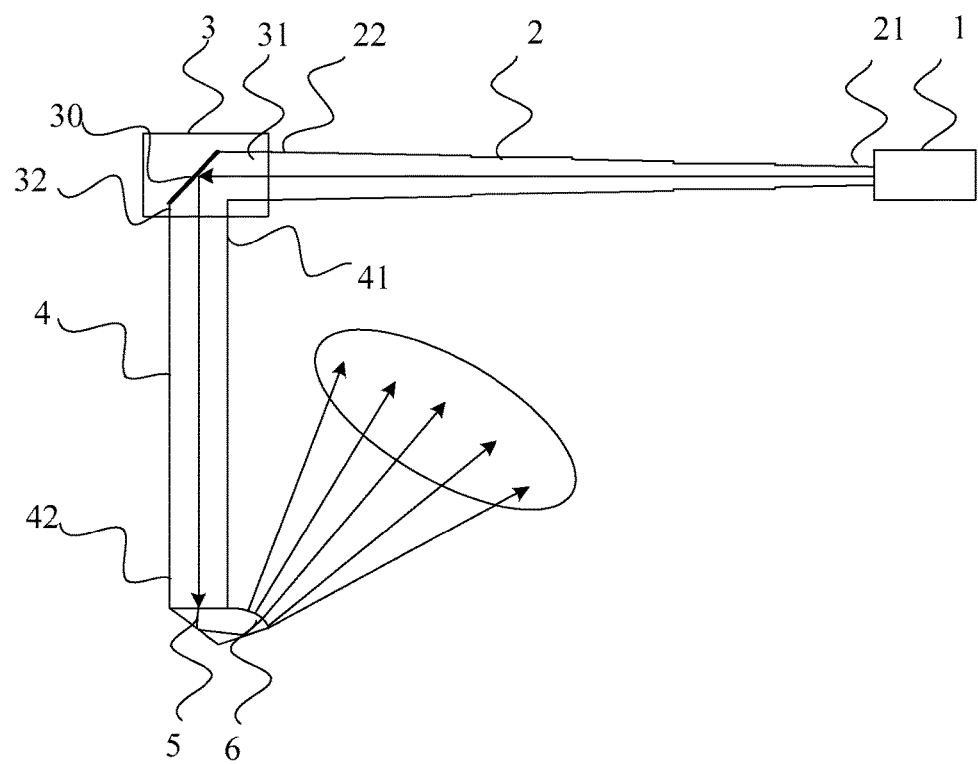
FIG. 3 is a diagram of light path obtained by the backlight source according to the first embodiment of the present disclosure.

The light path diagram obtained by the backlight source described above is as illustrated in FIG. 3, its operation principle is as follow:

Light emitted from the light source 1 passes through the guide fiber 2, and is transmitted to the coupling joint 3, and then is reflected by the reflection element 30 in the coupling joint 3, the light is deflected by 90°, and then enters the transmission fiber 4, and finally is totally reflected by the reflection head 5 arranged at the second end 42 of the transmission fiber 4, the reflected light is further refracted by the curved lens, the emitted light irradiates out uniformly and projects onto the display screen so as to function as a backlight.

Due to the characteristic of being collapsible, the aforesaid backlight source is flexible and easy to use, and is suitable for the backlight of the transparent display device, thus has good adaptability.

Embodiment Two

Figure 4:
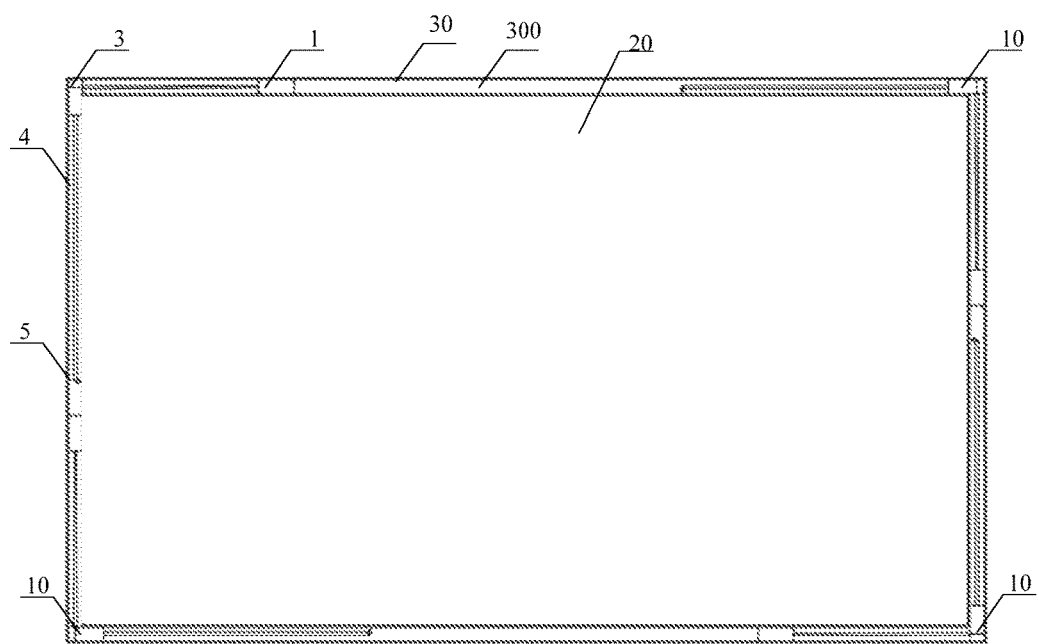
FIG. 4 is a schematic view illustrating the back side of a transparent display device using the backlight source according to the second embodiment of the present disclosure.
Figure 5:
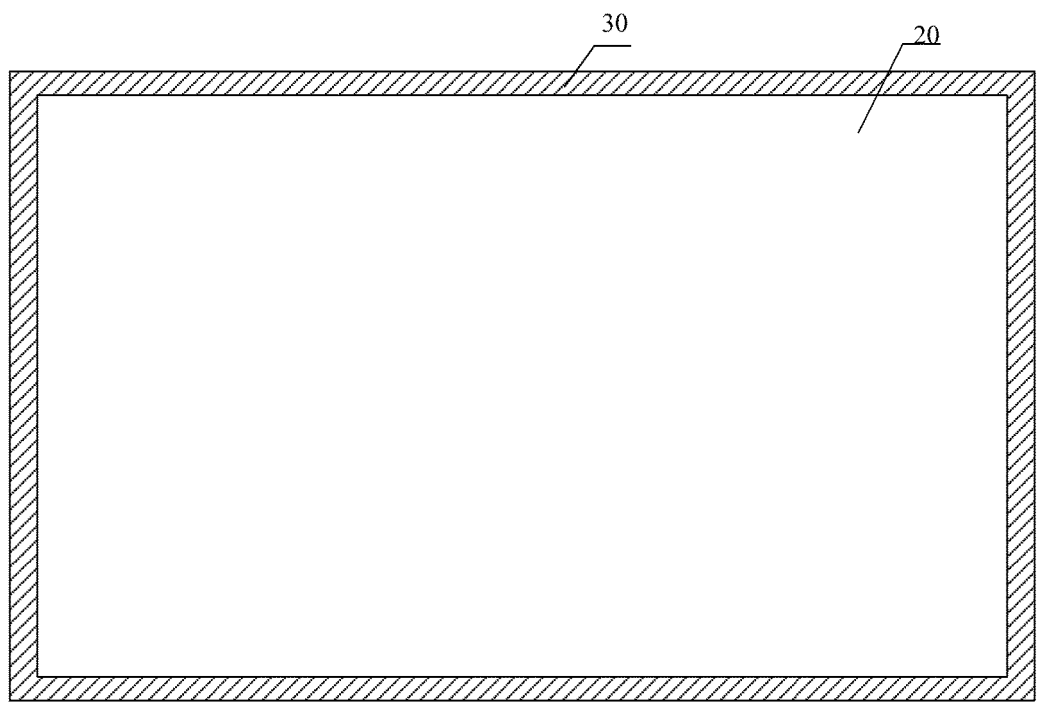
FIG. 5 is a schematic view illustrating the front side of the transparent display device according to the second embodiment of the present disclosure.

The second embodiment of the present disclosure also provides a transparent display device, a schematic view of its back side can be seen in FIG. 4, the transparent display comprises a display screen 20 and a frame 30, and further comprises the backlight source 10 of the above embodiment one. The frame 30 is provided with grooves 300 at its back side, the light source 1 is embedded within the grooves 300, and the guide fiber 2 of the backlight source 10 is always embedded within the grooves 300 at the back side of the frame 30, while the transmission fiber 4 is embedded within the grooves 300 at the back side of the frame 30 when being folded, and rotates around an central axis of the guide fiber 2 when being unfolded so as to protrude from the groove 300. When the transmission fiber 4 is unfolded, light emitted from the light source 1 can be projected onto the back side of the display screen 20. In the present embodiment, as a backlight source that is collapsible is embedded within the back side of the frame, the front side of the display device is hardly different from ordinary transparent display devices, as illustrated in FIG. 5.

For example, the guide fiber 2 and the transmission fiber 4 of this embodiment are orthogonal to each other, and the frame 30 has a rectangular shape;

the coupling joint 3 of the backlight source 10 is embedded within one of the four corner portions of the frame 30, and the guide fiber 2 and the transmission fiber are respectively embedded within grooves constituting the two sides of the corner portion. Four coupling joints 3 are embedded within four corner portions of the groove 300 at the back side of the frame, and the guide fiber 2 and the transmission fiber 4 coupled with each of the coupling joints are embedded within the grooves 300 constituting the two sides of the corner portion.

The transmission fiber 4 is perpendicular to the display screen 20 when being sufficiently unfolded, so that the light, emitted from the transmission fiber 4 and then reflected by the reflection head 5, can be projected onto the back side of the screen 20, thereby a backlight can be achieved.

Figure 6:
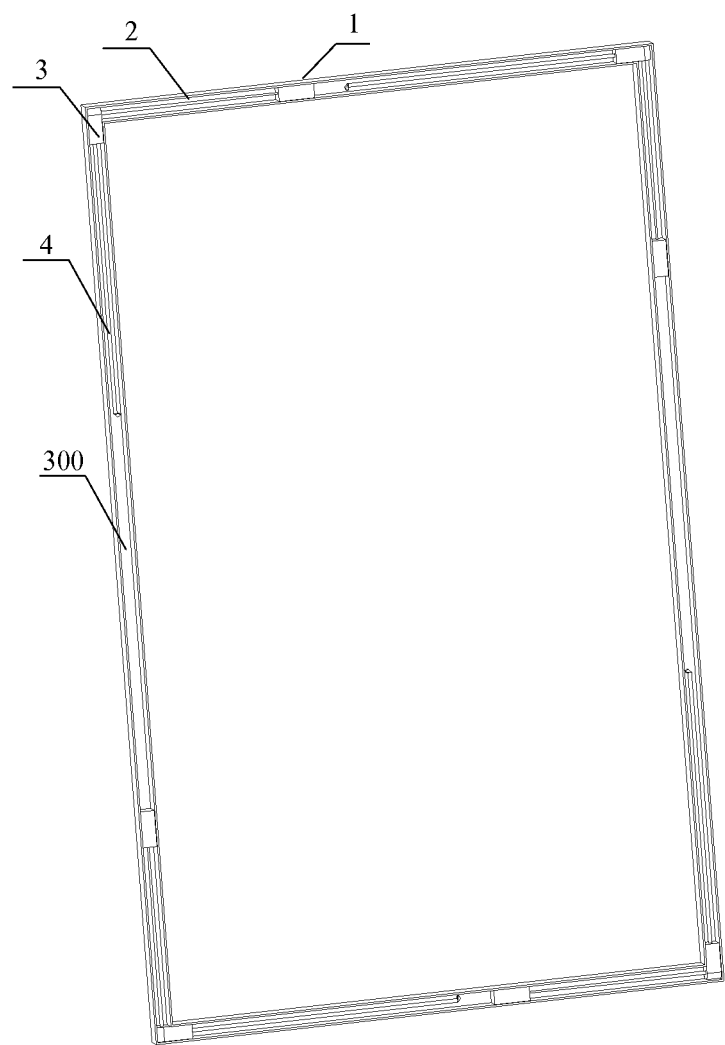
FIG. 6 is a schematic perspective structural view illustrating the back side of the transparent display device according to the second embodiment of the present disclosure when the transmission fiber is folded.
Figure 7:
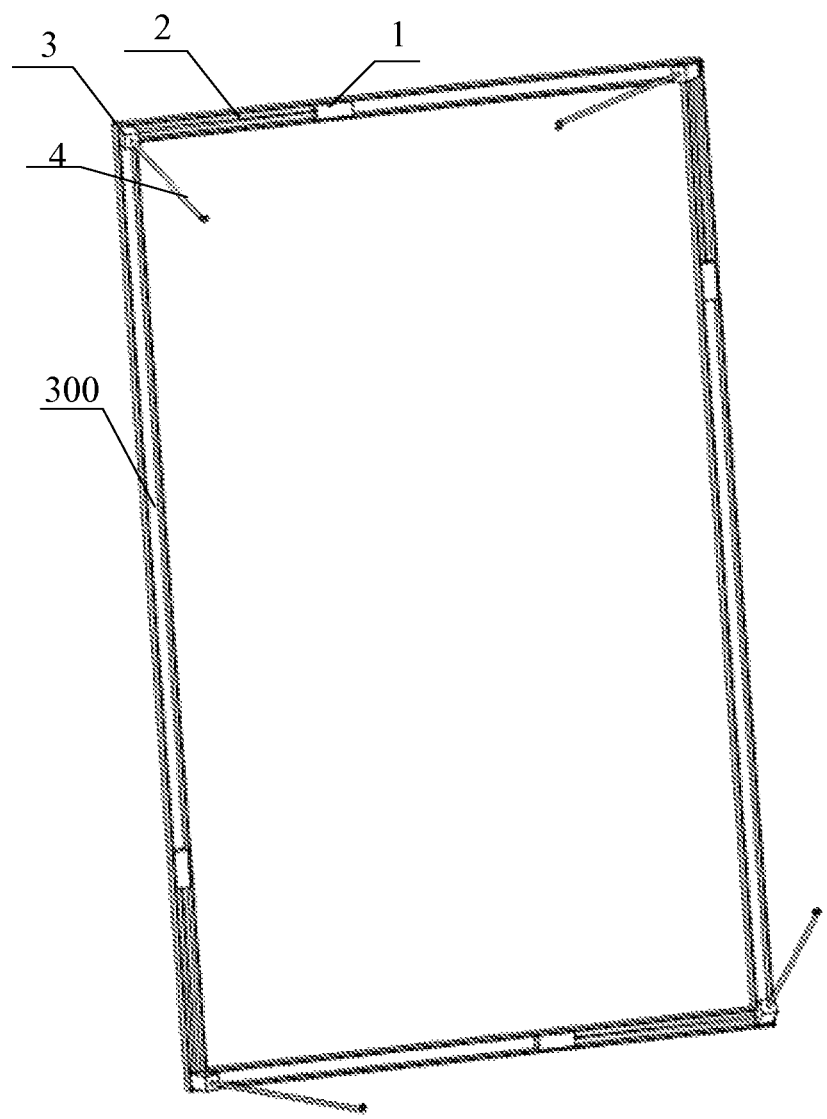
FIG. 7 is a schematic perspective structural view illustrating the back side of the transparent display device according to the second embodiment of the present disclosure when the transmission fiber is unfolded.

FIG. 6 is a schematic view illustrating the structure of the back side of the transparent display when the transmission fiber is folded up, and FIG. 7 is a schematic view illustrating the three-dimensional structure of the back side when the transmission fiber is unfolded. The transmission fiber protrudes from the groove of the frame and is perpendicular to the display screen when being unfolded. Light emitted from the light source 1 passes through the guide fiber 2, and is transmitted to the coupling joint 3, and then is reflected and enters into the transmission fiber, finally, is subjected to total reflection performed by the reflection head 5 provided at the second end 42 of the transmission fiber 4, the reflected light then is refracted by means of a curved lens, the obtained light is transmitted onto the back side of the screen, thus a backlight is obtained.

A fixed connection can be used between the guide fiber 2 and the coupling joint 3 and between the coupling joint 3 and the transmission fiber 4. And at this time, the guide fiber 2 can rotate within the groove 300. When the transmission fiber 4 being unfolded, the guide fiber 2 can rotate within the groove 300, and the transmission fiber 4 rotates as the guide fiber 2 rotates and thus protrudes from the groove 300; or The second end 22 of the guide fiber 2 is flexibly coupled to the first port 31 of the coupling joint 3, and when the transmission fiber 4 being unfolded, the guide fiber 4 is secured within the groove 300 and can rotates with respect to the coupling joint 3.

The transparent display device according to this embodiment achieves a backlight by utilizing a collapsible backlight source and embedding the same within the groove in the frames. When in use, the transmission fiber within the groove is unfolded and the reflection head performs a total reflection on the light in the transmission fiber, then through the refraction by the curved lens, light is uniformly projected onto the back side of the display screen. Such an open type and collapsible backlight source presents good applicability, thus enhancing flexibility and convenience of the transparent display.

The foregoing are merely exemplary embodiments of the disclosure, but are not used to limit the protection scope of the disclosure. The protection scope of the disclosure shall be defined by the attached claims.

The present application claims the priority of the Chinese patent application No. 201410038079.7 , filed on Jan. 26, 2014, the disclosure of which is hereby entirely incorporated by reference.

The invention claimed is:

1. A backlight source comprising a light source, guide fibers and transmission fibers, each of the guide fibers and each of the transmission fibers are coupled by a coupling joint, wherein a first end of each of the guide fibers is coupled to the light source and a second end of each of the guide fibers is coupled to a first port of the coupling joint, the coupling joint is provided with reflection elements therein, a first end of each of the transmission fibers is coupled to a second port of the coupling joint, the reflection elements are configured to reflect light into the transmission fibers, and a second end of each of the transmission fibers is provided with a reflex, which comprises a total reflection head, the total reflection head is provided with a curved lens at an end away from the transmission fibers; each of the guide fibers and each of the transmission fibers are orthogonal to each other, and the light source is a light source of narrow divergence angle in a range of 0-15 degrees, such that light emitted from the light source passes through each of the guide fibers and enters into the coupling joint, then is reflected by the reflection elements in the coupling joint into the transmission fibers, and directly transmitted to the total reflection head by the transmission fibers, and is finally emitted by the reflex; and wherein the total reflection head totally reflects the light to the curved lens, and the light is emitted by the curved lens to obtain uniform light.

2. A transparent display device comprising a display screen and a frame, the transparent display device further comprising a backlight source according to claim 1, a back side of the frame is provided with grooves in which the backlight source is embedded, each of the guide fibers of the backlight source is embedded within the grooves at the back side of the frame, the transmission fibers rotate around a central axis of the respective guide fibers such that, when folded, each of the transmission fibers is embedded within the grooves at the back side of the frame and when unfolded, each of the transmission fibers protrude from the grooves; and when each of the transmission fibers is in an unfolded position, light emitted from the backlight source is projected onto the back side of the display screen.

3. The transparent display device according to claim 2, wherein each of the guide fibers and each of the transmission fibers of the backlight source are orthogonal to each other, the frame has a rectangular shape, the coupling joint of the backlight source is embedded within one of four corner portions of the frame, and each of the guide fibers and each of the transmission fibers are embedded within the grooves at two sides forming the one corner portion respectively.

4. The transparent display device according to claim 2, wherein each of the transmission fibers is perpendicular to a plane of the display screen when the transmission fibers are in the unfolded position.

5. The transparent display device according to claim 2, wherein the second end of each of the guide fibers is fixedly connected to the coupling joint, the first end of each of the transmission fibers is fixedly connected to the coupling joint, each of the guide fibers rotates within the grooves and each of the transmission fibers rotates along with the guide fibers and thus protrudes from the grooves; or the second end of each of the guide fibers is coupled to the first port of the coupling joint so as to rotate with respect to the coupling joint; the respective guide fibers are secured within the grooves and each of the transmission fibers rotates with respect to a central axis of the respective guide fibers and protrudes from the grooves when each of the transmission fibers is in the unfolded position.

6. The backlight source according to claim 1, wherein each of the guide fibers is a conical fiber, a top end of which is coupled to the light source and a bottom end of which is coupled to the coupling joint.

\* \* \* \* \*